United States Patent
Lee et al.

(10) Patent No.: US 12,175,361 B2
(45) Date of Patent: Dec. 24, 2024

(54) ELECTRONIC DEVICE, IMAGE PROCESSING METHOD OF ELECTRONIC DEVICE, AND COMPUTER-READABLE MEDIUM

(71) Applicant: Samsung Electronics Co., Ltd., Suwon-si (KR)

(72) Inventors: Cheon Lee, Suwon-si (KR); Sungho Kang, Suwon-si (KR); Hyungdal Kwon, Suwon-si (KR); Yunjae Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1018 days.

(21) Appl. No.: 16/979,303

(22) PCT Filed: Mar. 6, 2019

(86) PCT No.: PCT/KR2019/002592
§ 371 (c)(1),
(2) Date: Sep. 9, 2020

(87) PCT Pub. No.: WO2019/182269
PCT Pub. Date: Sep. 26, 2019

(65) Prior Publication Data
US 2020/0401889 A1    Dec. 24, 2020

(30) Foreign Application Priority Data
Mar. 19, 2018  (KR) .................. 10-2018-0031348

(51) Int. Cl.
*G06N 3/08*  (2023.01)
*G06F 9/50*  (2006.01)
*G06T 5/00*  (2006.01)

(52) U.S. Cl.
CPC ............ *G06N 3/08* (2013.01); *G06F 9/5027* (2013.01); *G06T 5/00* (2013.01); *G06T 2207/20081* (2013.01); *G06T 2207/20084* (2013.01)

(58) Field of Classification Search
CPC .............. G06N 3/08; G06T 5/001; G06T 5/00
See application file for complete search history.

(56) References Cited

U.S. PATENT DOCUMENTS 5,995,669 A   11/1999  Shingu et al.
7,636,493 B2  12/2009  Sakaguchi et al.
(Continued)

FOREIGN PATENT DOCUMENTS

JP          5116803 B2       1/2013
KR    10-2017-0000767 A    1/2017
(Continued)

OTHER PUBLICATIONS

Korean Office Action dated Jul. 17, 2022, issued in Korean Application No. 10-2018-0031348.

*Primary Examiner* — Claudia Dragoescu
(74) *Attorney, Agent, or Firm* — Jefferson IP Law, LLP

(57) ABSTRACT

The present disclosure relates to an artificial intelligence (AI) system that utilizes a machine learning algorithm, and applications therefore. Disclosed is an electronic device. The electronic device comprises: a storage unit which stores therein an artificial intelligence model trained to determine parameters for a plurality of filters used for image processing on the basis of a deep neural network (DNN); and a processor for determining, through the artificial intelligence mode, parameters for each of the plurality of filters used for image processing for an input image, and performing, through the plurality of filters, filtering of the input image on
(Continued)

the basis of the determined parameters so as to perform image processing for the input image.

8 Claims, 9 Drawing Sheets

(56) References Cited

U.S. PATENT DOCUMENTS

| | | | |
|---|---|---|---|
| 9,589,210 B1 | 3/2017 | Estrada et al. | |
| 9,734,567 B2 | 8/2017 | Zhang et al. | |
| 10,255,689 B2 | 4/2019 | Lee et al. | |
| 2008/0031538 A1* | 2/2008 | Jiang | G06T 5/002 |
| | | | 348/E5.064 |
| 2010/0046834 A1* | 2/2010 | Ohga | H04N 1/6088 |
| | | | 382/167 |
| 2013/0128111 A1 | 5/2013 | Corral-Soto | |
| 2016/0379352 A1* | 12/2016 | Zhang | G06N 3/045 |
| | | | 382/157 |
| 2017/0053211 A1* | 2/2017 | Heo | G06N 20/00 |
| 2017/0061584 A1 | 3/2017 | Lim et al. | |
| 2017/0344881 A1 | 11/2017 | Okuno et al. | |
| 2018/0160981 A1* | 6/2018 | Tsymbalenko | A61B 8/5215 |
| 2018/0293493 A1* | 10/2018 | Kalamkar | G06T 1/20 |

FOREIGN PATENT DOCUMENTS

| | | |
|---|---|---|
| KR | 10-2017-0098089 A | 8/2017 |
| KR | 10-2018-0013092 A | 2/2018 |

* cited by examiner

FIG. 4
| TRAINING IMAGE | TRAINING PARAMETER | | | ESTIMATED RESULT |
|---|---|---|---|---|
| | NOISE REMOVAL FILTER PARAMETER | SHARPNESS ENHANCEMENT FILTER PARAMETER | CONTRAST CORRECTION FILTER PARAMETER | |
| IMAGE 1 | 32 | 0 | 0 | 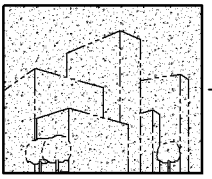 |
| IMAGE 2 | 0 | 20 | 0 | 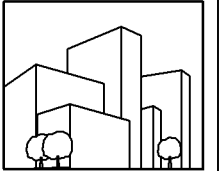 |
| IMAGE 3 | 0 | 0 | 25 | 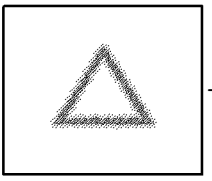 |

FIG. 5

| TRAINING IMAGE | NOISE REMOVAL FILTER PARAMETER | | | SHARPNESS ENHANCEMENT FILTER PARAMETER | | | | CONTRAST CORRECTION FILTER PARAMETER | | COLOR ENHANCEMENT FILTER PARAMETER | | | | | |
|---|---|---|---|---|---|---|---|---|---|---|---|---|---|---|---|
| | random noise | blocky noise | mosquito noise | Edge | High Texture | Mid Texture | Low Texture | Upper Gain | Lower Gain | Red Gain | Green Gain | Blue Gain | Cyan Gain | Magenta Gain | Yellow Gain |
| IMAGE 1 | 32 | 0 | 0 | 10 | 0 | 15 | 10 | 0 | 20 | 3 | 0 | 0 | 0 | 0 | 0 |
| IMAGE 2 | 0 | 30 | 0 | 0 | 0 | 0 | 7 | 0 | 0 | 0 | 4 | 2 | 0 | 15 | 10 |
| IMAGE 3 | 0 | 20 | 28 | 0 | 10 | 0 | 5 | 3 | 10 | 0 | 3 | 0 | 2 | 0 | 0 |
| IMAGE 4 | 0 | 30 | 0 | 0 | 0 | 17 | 11 | 0 | 21 | 0 | 0 | 0 | 0 | 0 | 0 |
| IMAGE 5 | 32 | 0 | 0 | 15 | 0 | 0 | 12 | 32 | 0 | 17 | 0 | 0 | 35 | 0 | 0 |
| IMAGE 6 | 32 | 12 | 0 | 3 | 0 | 21 | 4 | 0 | 1 | 0 | 0 | 0 | 21 | 0 | 0 |
| IMAGE 7 | 32 | 0 | 22 | 0 | 12 | 0 | 16 | 24 | 4 | 0 | 2 | 3 | 0 | 0 | 0 |
| IMAGE 8 | 32 | 0 | 0 | 0 | 0 | 0 | 7 | 0 | 0 | 1 | 0 | 3 | 10 | 0 | 20 |

FIG. 8

| TRAINING SOUND | TRAINING PARAMETER | | | | |
|---|---|---|---|---|---|
| | NOISE FILTER PARAMETER | LOW PASS FILTER PARAMETER | MEDIAN PASS FILTER PARAMETER | HIGH PASS FILTER PARAMETER | PRE-SET PARAMETER |
| SOUND 1 | 32 | 2 | 5 | 10 | 4 |
| SOUND 2 | 0 | 10 | 15 | 20 | 3 |
| SOUND 3 | 11 | 5 | 25 | 5 | 1 |
| SOUND 4 | 5 | 25 | 5 | 1 | 6 |

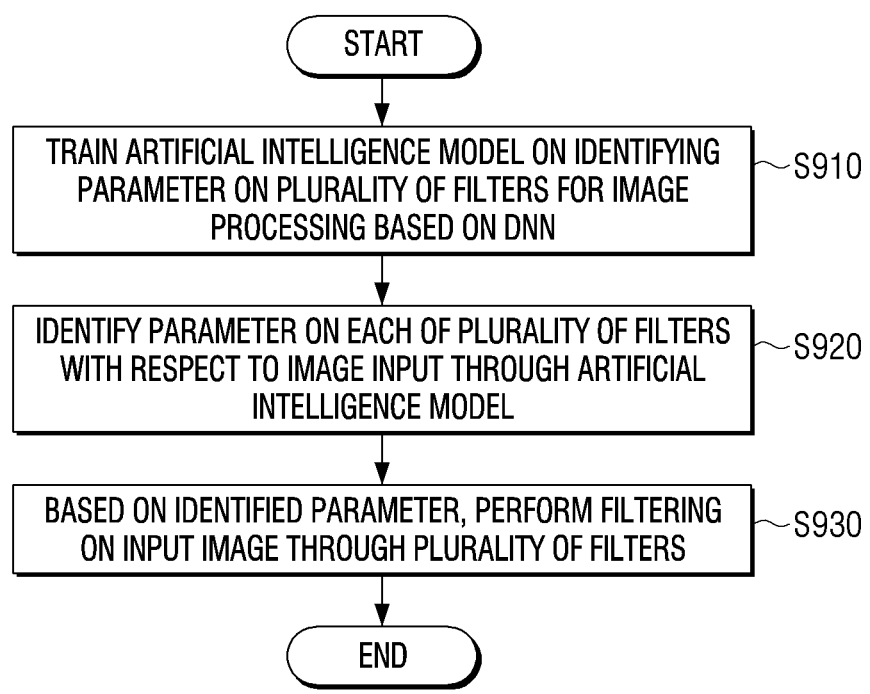

ELECTRONIC DEVICE, IMAGE PROCESSING METHOD OF ELECTRONIC DEVICE, AND COMPUTER-READABLE MEDIUM

TECHNICAL FIELD

The disclosure relates to an electronic device that processes image, and more specifically to an electronic device, which through an artificial intelligence model trained based on a deep neural network (DNN) to identify parameters on a plurality of filters used in image processing, identifies a parameter on each of the plurality of filters used in the image processing of an input image, and performs image processing on the input image through the plurality of filters based on the identified parameter.

In addition, the disclosure relates to an artificial intelligence (AI) system that utilizes a machine learning algorithm to simulate functions such as recognition and determination of a human brain, and an application thereof.

BACKGROUND ART

In terms of electronic devices that processes images, applications of image enhancing algorithm based on conventional hardware involved applying a separate image enhancing algorithm for each image enhancing element such as noise, sharpness, and contrast ratio by hardware and performing image enhancement.

However, while it is common of image enhancement technology to be developed independently per various image enhancement element in general, because most configurations of the electronic device hardware, which are consumer products, are determined at the product manufacturing process, conventional image enhancement algorithms based on hardware have been problematic with respect to the difficulty of instantaneously introducing new technology for each image enhancing element to consumer products (i.e., electronic devices).

In addition, electronic device chips including conventional image analysis and filter configurations are problematic due to high costs as the size of the chips become bigger with the development of image enhancing technology.

Conventional technology for setting a fixed value for each image enhancement mode generally involved dividing the image enhancement mode to dynamic mode, movie mode, standard mode, and the like, to provide users with an image enhancement effect based on the mode. As an example of a conventional classification of image enhancement modes, the image enhancement modes may be classified to a sharp mode suitable for sports or a high-definition documentary where image enhancement is strongly applied so that color and detail are clearly visible to the eye from a distance, a movie mode where image enhancement is barely made to provide an image quality that guarantees the intent of the movie producer, a standard mode where an intermediate image enhancement of a between a sharp mode and a movie mode is made and is the most commonly used, and the like.

However, conventional technology, not only includes a suitable image enhancement mode based on the image, but also the inconvenience of a user having to directly determine the features of the image and directly select and command which mode to perform the image enhancement.

An artificial intelligence system may refer to a computer system that realizes an intelligence of a human level, where a machine self-trains and determines, and improves accuracy in recognition and determination the more it is used.

An artificial intelligence technology may include a machine learning (deep learning) technology using an algorithm that self-classifies/learns features of input data and element technologies that simulate functions such as recognition and determination of a human brain by utilizing a machine learning algorithm Element technologies may include, for example, a linguistic understanding technology that recognizes human language/characters, a visual comprehension technology that recognizes objects as in a human visual aspect, an inference/prediction technology that determines information and performs logical inferences and predictions, a knowledge representation technology that processes human experience information into knowledge data, an operation control technology that controls an autonomous driving of a vehicle and movement of a robot, and the like.

In particular, visual comprehension technology may refer to a technology that processes objects as in a human visual aspect and may include object recognition, object tracking, image search, human recognition, scene understanding, spatial understanding, image enhancement, and the like.

DISCLOSURE

Technical Problem

The disclosure provides an electronic device capable of easily updating an image enhancing technology while reducing costs as the complexity of a chip for image processing is reduced by performing an analysis on respective filters performing different filtering from one another and by integrating the controllers to an artificial intelligence model capable of learning.

The disclosure not only provides an electronic device capable of finding parameters such as type, function and the like of an image processing filter that are most suitable to a predetermined hardware environment, but also provides an electronic device that includes an artificial intelligence model trained to provide control variations suitable for a hardware configuration for image processing even when the hardware configurations are modified.

In addition, the disclosure provides an electronic device that analyzes images using a deep neural network (DNN) based image enhancement chip, and infers and applies a fixed image quality setting parameter and a variable setting parameter suitable for a scene of the image to provide a user with optimum image quality, which is enhanced in real-time.

Technical Solution

According to an embodiment, an electronic device includes a storage stored with an artificial intelligence model trained to identify a parameter on a plurality of filters used in an image processing based on a deep neural network (DNN), and a processor configured to, through the artificial intelligence model, identify a parameter on each of the plurality of filters used in the image processing of an input image, and perform filtering on the input image through the plurality of filters based on the identified parameter to perform image processing on the input image.

The plurality of filters may include at least two of a filter for noise reduction filter, a filter for sharpness enhancement, a filter for contrast correction, a filter for color correction, a filter for brightness adjustment, and a filter for performing mosaic processing on the input image.

The artificial intelligence model may be trained based on an image and a parameter on each of the plurality of filters required when performing filtering on the image to convert the image to a target image.

The artificial intelligence model may be trained on a feature of an image signal corresponding to the image and a correlation in parameter on each of the plurality of the filters required.

The processor may be configured to, based on a feature of an image signal corresponding to the input image and the correlation, identify a parameter on each of the plurality of filters used in an image processing of the input image.

The artificial intelligence model may be additionally trained through the image to be input and the identified parameter after being trained based on the image and a parameter on each of the plurality of filters.

Alternatively, the artificial intelligence model may be additionally trained on a content consumption environment of a user based on the image to be input after being trained based on the image and the parameter on each of the plurality of filters.

The processor may be configured to perform filtering on the input image sequentially through the plurality of filters based on the identified parameter.

The electronic device may further include a DNN accelerator, and the artificial intelligence model may be trained to identify a parameter on a plurality of filters used in image processing using the DNN accelerator.

The each of the plurality of filters filtering the input image may be determined by the parameter.

According to an embodiment, an image processing method of an electronic device includes training an artificial intelligence model to identify a parameter on a plurality of filters used in image processing based on a deep neural network (DNN), identifying a parameter on each of a plurality of filters used in the image processing of the input image through the artificial intelligence model, and performing image processing on the input image by performing filtering on the input image through the plurality of filters based on the identified parameter.

The plurality of filters may include at least two of a filter for noise reduction, a filter for sharpness enhancement, a filter for color correction, a filter for color correction, a filter for brightness adjustment, and a filter for performing mosaic processing on the input image.

The training the artificial intelligence model may include training the artificial intelligence model based on an image and a parameter on each of the plurality of filters required when performing filtering on the image to convert the image to a target image.

The training the artificial intelligence model may include training the artificial intelligence model for the artificial intelligence model to identify a feature of an image signal corresponding to the image and a correlation of a parameter on each of the plurality of filters required.

The identifying the parameter may include, based on the feature of an image signal corresponding to the input image and the correlation, identifying a parameter on each of a plurality of filters used in the image processing of the input image.

The training the artificial intelligence model may include additionally training the artificial intelligence model through the image to be input and the identified parameter after training the artificial intelligence model based on the image and the parameter on each of the plurality of filters.

Alternatively, the training the artificial intelligence model may include additionally training the artificial intelligence model on a content consumption environment of a user based on the image to be input after training the artificial intelligence model based on the image and the parameter on each of the plurality of filters.

The performing the image processing may include performing filtering on the input image sequentially through the plurality of filters based on the identified parameter to perform image processing on the input image.

In addition, the training the artificial intelligence model may include training the artificial intelligence model for the artificial intelligence model to use a DNN accelerator to identify a parameter on a plurality of filters used in the image processing.

The each of the plurality of filters filtering the input image may be identified by the parameter.

According to an embodiment, a non-transitory computer-readable medium storing computer instructions executed by a processor of an electronic apparatus to cause the electronic apparatus perform operations comprising, training an artificial intelligence model to identify a parameter on a plurality of filters used in an image processing based on a deep neural network (DNN), identifying a parameter on each of the plurality of filters used in the image processing of an input image through the artificial intelligence model, and performing filtering on the input image through the plurality of filters based on the identified parameter to perform image processing on the input image.

Effect of Invention

An electronic device, an image processing method of an electronic device, and a computer-readable medium according to the disclosure may, by integrating an analyzer on respective filters performing different filtering from one another into one artificial intelligence model, not only easily update an image enhancement technology of an electronic device, but also provide a gradual and active image enhancement effect based on a hardware environment of the electronic device and a content consumption environment of a user.

In addition, the electronic device according to the disclosure may, compared to conventional technology of each analyzer of an image processing filter being configured as a hardware, reduce cost for hardware configuration of an electronic device due to the complexity of a chip for image processing being reduced.

DESCRIPTION OF DRAWINGS

FIGS. 4 to 5 are diagrams illustrating a training subject of an artificial intelligence model in terms of an electronic device processing an image according to an embodiment of the disclosure;

FIG. 8 is a diagram illustrating a training subject of an artificial intelligence model in terms of an electronic device processing audio signals according to an embodiment of the disclosure; and FIG. 9 is a flowchart illustrating an image processing method of an electronic device according to an embodiment of the disclosure.

DETAILED DESCRIPTION OF EXEMPLARY EMBODIMENTS

Figure 1A:
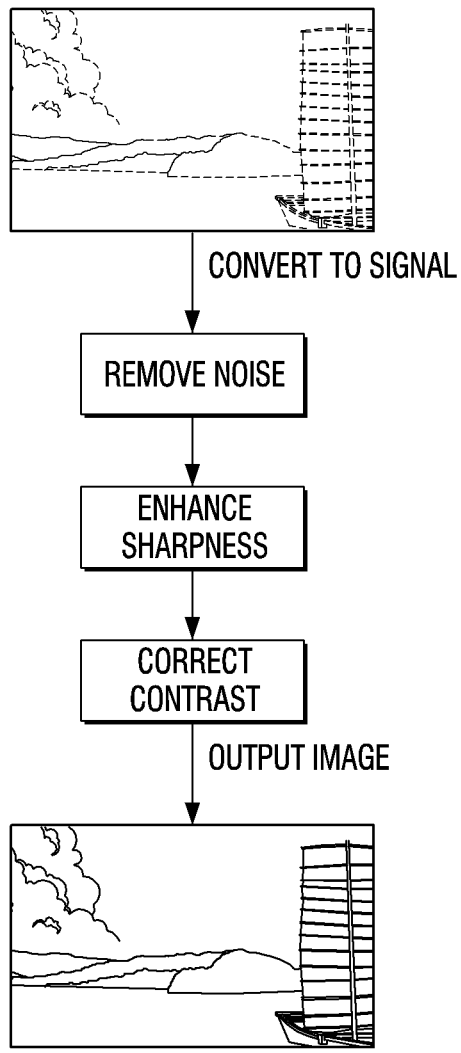
FIGS. 1A and 1B are diagrams illustrating a comparison of an image processing method according to the disclosure and a conventional image processing method for image enhancement.

Before describing the disclosure, terms of the disclosure and drawings will be described.

The terms used in the disclosure are general terms identified in consideration of the functions of the various embodiments of the disclosure. However, these terms may vary depending on intention, legal or technical interpretation, emergence of new technologies, and the like of those skilled in the related field of art. In addition, there may be some arbitrary terms. These terms may be construed based on the overall contents and technological common sense of those skilled in the related field of art, unless otherwise specified.

Further, like reference numerals or symbols disclosed in accompanying each drawing indicate like components or elements that perform substantially the same functions throughout the disclosure. For convenience of descriptions and understanding, the same reference numerals or symbols are used and described in different embodiments. In other words, although elements having the same reference numerals are all illustrated in a plurality of drawings, the plurality of drawings do not refer to only one embodiment.

The terms including ordinal numbers such as "first," "second," and so on may be used to differentiate between elements in the disclosure. However, these ordinal numbers are used merely to distinguish same or similar elements from another, and should not be understood as limiting the meaning of the terms as a result of using these ordinal numbers. For example, the elements associated with the ordinal numbers should not be limited in order or order of use by the numbers. If necessary, each ordinal number may be used interchangeably.

A singular expression in the disclosure includes a plural expression, unless otherwise specified clearly in context. It is to be understood that the terms such as "comprise" or "consist of" are used herein to designate a presence of a characteristic, a number, a step, an operation, an element, a component, or a combination thereof, and not to preclude a presence or a possibility of adding one or more of other characteristics, numbers, steps, operations, elements, components or a combination thereof.

In the embodiments of the disclosure, terms such as "module," "unit," "part", and the like may be used to refer to an element that performs at least one function or operation, and such element may be implemented as hardware or software, or a combination of hardware and software. Further, except for when each of a plurality of "modules", "units", "parts", and the like is to be realized in an individual hardware, the components may be integrated in at least one module or chip and implemented in at least one processor.

In addition, in the embodiments described herein, when any part is indicated as connected to another part, this includes not only a direct connection, but also an indirect connection through another medium. Further, when a certain part includes a certain element, rather than precluding another element, an another element may be additionally included, unless specified otherwise.

The disclosure will be described in detail below using the accompanying drawings.

Figure 1B:
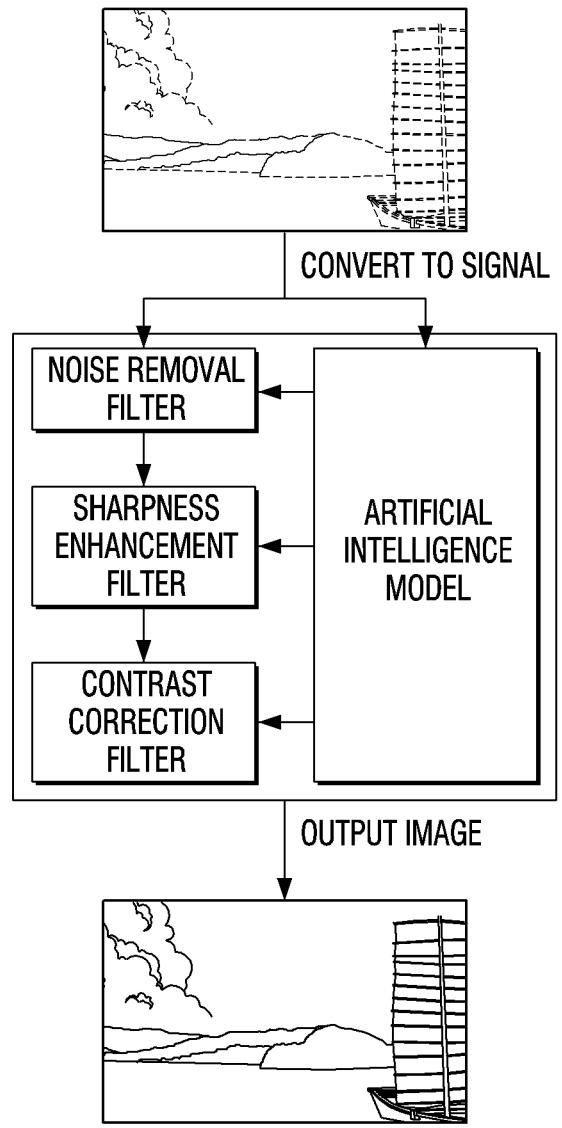

FIGS. 1A and 1B are diagrams for comparing conventional technology and technology according to the disclosure for image enhancement. FIG. 1A is a diagram illustrating a conventional image processing method, and FIG. 1B is a diagram illustrating an image processing method according to the disclosure.

FIG. 1A illustrates a general and schematic process of image enhancement on an input image.

Referring to FIG. 1A, conventionally, a general image processing method involves converting the input image to an image signal, and then the converted image signal going through a plurality of image processing configured as a hardware.

Specifically, the converted image signal may go through a noise analysis and noise removal filtering, a sharpness analysis and a sharpness enhancement filtering, a contrast ratio analysis and a contrast correction filtering, and conventional chips that perform these processes, in many cases, were of high cost due to the size of the chip becoming larger with the growing complexities.

In addition, because conventional chips were designed to comprehensively perform all kinds of functions in general, and it was difficult apply improvements or updates to the independent functions on noise removal, sharpness enhancement, and contrast correction, respectively, in real-time.

Referring to FIG. 1B, the electronic device according to an embodiment may separately include one integrated artificial intelligence model for controlling all of the respective filters used in the noise removal, the sharpness enhancement, and the contrast correction.

The image processing method according to an embodiment includes converting the input image to an image signal, and then inputting the converted image signal to at least one filter (i.e., noise removal filter in the case of FIG. 1B) while concurrently inputting to the artificial intelligence model.

The artificial intelligence model may then analyze the input image, that is, the converted image signal, and control each of the noise removal filter, the sharpness enhancement filter, and the contrast correction filter based on the analyzed result.

Through the above, the noise removal filter, the sharpness enhancement filter, and the contrast correction filter may perform filtering for the image enhancement of the input image based on the control of the artificial intelligence model.

That is, with respect to the electronic device according to FIG. 1B, although the respective filters for image processing may be implemented as a hardware, because at least a control logic for controlling each filter is implemented as an artificial intelligence model capable of learning, the electronic device may be lightened in weight.

The configuration and operation of the electronic device according to an embodiment will be described in greater detail below.

Figure 2:
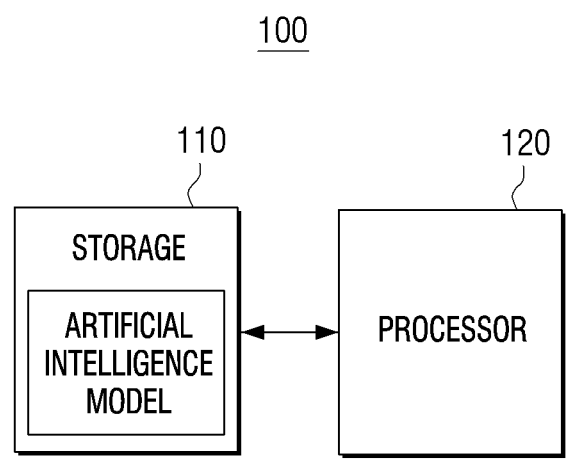
FIG. 2 is a block diagram illustrating a configuration of an electronic device according to an embodiment of the disclosure.

FIG. 2 is a block diagram illustrating a configuration of an electronic device 100 according to an embodiment of the disclosure. The electronic device 100 may be implemented as a television (TV), a set-top box, a mobile phone, a monitor, and the like.

Referring to FIG. 2, the electronic device 100 may include a storage 110 and a processor 120.

The storage 110 may be implemented as a non-volatile memory (e.g., read-only memory (ROM), hard disk, solid state drive (SSD), flash memory), a volatile memory such as a random access memory (RAM), and the like.

The storage 110 may be stored with information on a various tasks or applications that the electronic device 100 may perform, and data related to the operational performance of the processor 120.

The storage 110 may be stored with data related to the image processing or sound processing performed by the processor 120.

Specifically, the storage 110 may be stored with an artificial intelligence model trained to identify a parameter on a plurality of filters used in image processing based on a deep neural network (DNN).

The plurality of filters used in the image processing may be implemented as a filter for noise reduction, a filter for sharpness enhancement, a filter for contrast correction, a filter for color correction, a filter for brightness adjustment, and the like on an image input to the electronic device 100. However, the embodiment is not limited thereto, and the types of filter may be varied according to how configurations of image processing filters to be controlled through the electronic device 100 are determined and designed.

The parameter on the plurality of filters, indicating a degree of filtering an input image by each of the plurality of filters, may refer to a control variable on each of the plurality of filters.

In an example, in performing filtering on an image input to the electronic device 100 by a filter for enhancing a red color, the degree of increasing the output of the red color included in the input image may be the parameter on the filter for enhancing the red color.

That is, the electronic device 100 may, based on identifying a parameter on each of the plurality of filters differently for each image to be input, control the degree of filtering performed by each of the plurality of filters.

The parameter may be divided into a fixed parameter with a setting value that is not changed for a predetermined period once the parameter is set, and a variable parameter with a setting value that is changed in real-time.

In an example, with respect to filters for image processing, the fixed parameter, which is fixed after a setting value is changed when a change in the type of scene occurs, may include a parameter on a contrast correction ratio, color correction intensity, and the like. On the other hand, the variable parameter may correlate with the types of scenes but is continuously changed in real-time, and parameters such as degree of noise removal and degree of sharpness enhancement may be included in the variable parameter.

The processor 120 may control the overall operations of the electronic device 100. Specifically, the processor 120 may control each configuration of the electronic device 100 for converting or processing an image or sound input to the electronic device 100.

The processor 120 may be implemented as at least one of an application specific integrated circuit (ASIC), an embedded processor, a microprocessor, hardware control logic, a hardware finite state machine (FSM), and a digital signal processor (DSP). Although not illustrated, the processor 120 may further include an interface such as a bus for communicating with each of the configurations.

The processor 120 may, for example, control a plurality of hardware or software elements connected to the processor 120 by driving an operating system or an application program, and may perform various data processing and calculations. The processor 120 may also be implemented as a system on chip (SoC).

In an example, the processor 120 may further include a graphics processing unit (GPU) and/or an image signal processor. The processor 120 may load instructions or data received from at least one of the other elements (e.g., non-volatile memory) on the volatile memory and process the instructions or data, and may store the result data on the non-volatile memory.

The processor 120 may use information stored in the storage 110 to process the input image or store new information related to the image processing on the storage.

The processor 120 may train an artificial intelligence model, and store the trained artificial intelligence model on the storage 110. Specifically, an operation to be performed according to conditions may be decided based on the trained artificial intelligence model.

The artificial intelligence model may be built considering the field of application, object of training, computer performance of the device, or the like. The artificial intelligence model may be, for example, a model based on a neural network.

The artificial intelligence model may include a plurality of network nodes with a weight value for simulating neurons of a human neural network. The plurality of network nodes may respectively form a connection relationship for the neurons to simulate a synaptic activity of sending and receiving signals through a synapse. In an example, the artificial intelligence model may include a neural network model or a deep learning model developed from a neural network model. The plurality of network nodes may be positioned at different depths (or layers) from one another in the deep learning model and may send and receive data based on a convolution connection relationship.

For example, models such as a deep neural network (DNN), a recurrent neural network (RNN), and a bidirectional recurrent deep neural network (BRDNN) may be used as a data recognition model, but the embodiment is not limited thereto.

The DNN may refer to an artificial neural network comprised of several hidden layers in-between an input layer and an output layer.

That is, the DNN may perform modeling of complex non-linear relationships between numerous elements from input to output. The DNN may be advantageous in that modeling of complex data may be performed with only units (or nodes) of a relatively small number.

A layer structure of the DNN may be designed similarly with a layer structure of an image classification using an existing convolutional layer.

For example, a convolutional neural network (CNN) structure for classifying an image may be used on the hidden layer structure of the DNN, and the number of nodes included in the output layer may be designed according to a number of parameters to be deduced.

Figure 3:
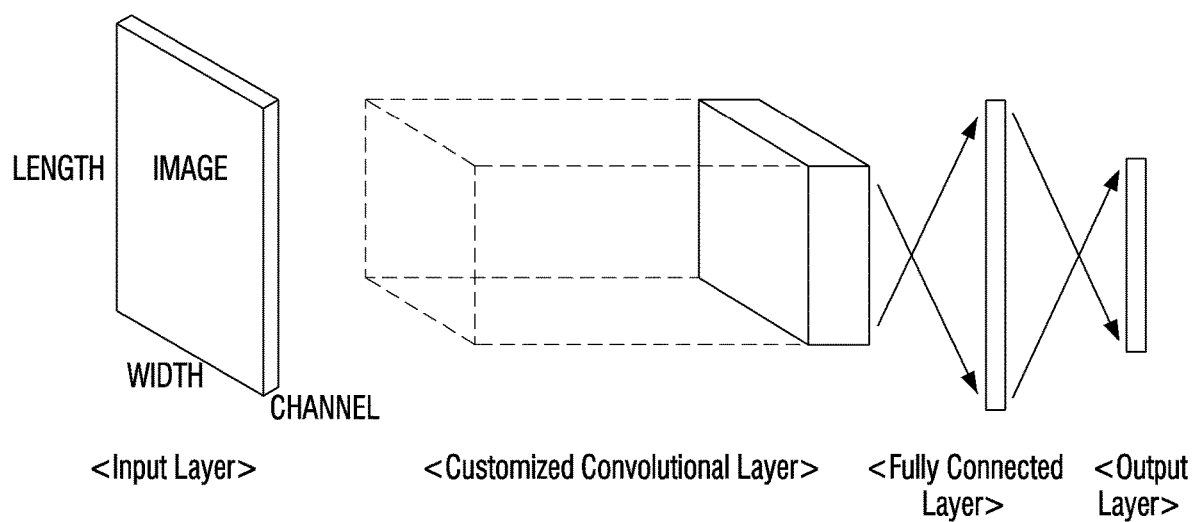
FIG. 3 is a diagram for illustrating an example of a deep neural network (DNN) used in an electronic device of the disclosure.

In an example, the DNN may be schematically configured as in FIG. 3 to train the artificial intelligence to identify a parameter on a plurality of filters used in the image processing.

Referring to FIG. 3, in terms of the DNN to which the artificial intelligence model is based, an image input to the electronic device 100 may be input to an input layer. Each pixel of the input image may be converted to an image signal and a numerical value may be input to each node of the input layer.

Referring to FIG. 3, the DNN to which the artificial intelligence model of the electronic device 100 is based may be designed for a hidden layer to be configured as a customized convolutional layer, and for a fully connected layer to be included between the customized convolutional layer and the output layer.

In addition, if the input data corresponds to not one image but a video in which a plurality of images are to be input to a time axis, the DNN structure may be designed to a recurrent neural network (RNN) structure.

The processor 120 may use training data related to sound information and training data related to image information to generate or train the artificial intelligence model.

When the artificial intelligence model is trained through a supervised learning method, the processor 120 may use a condition based on user intent and an action to be performed according to the condition as training data.

Alternatively, an event to be extracted according to the above-described condition and a function to be executed according to the above-described action may be added as training data, or a detection resource for detecting the above-described event and an execution resource for executing the above-described function may be added as training data.

The processor 120 may use training data related to the condition and the training data related to an action corresponding to the condition to generate and train the artificial intelligence model.

Alternatively, the processor 120 may use training data related to the event and the training data related to the function to generate and train the artificial intelligence model.

The artificial intelligence model may be pre-built, and may be a model which is updated by training using the processor 120. In this case, the artificial intelligence model may be in a pre-built state having received input of a basic training data (e.g., sample image, etc.).

The processor 120 may include an artificial intelligence (AI) dedicated hardware chip for the training of the artificial intelligence model.

As an example of the artificial intelligence (AI) dedicated hardware chip, the processor 120 may include and/or control a DNN accelerator for artificial intelligence training. The DNN accelerator may be a dedicated hardware chip designed to further accelerate the training of the DNN based artificial intelligence model.

For the training of the artificial intelligence model, the processor 120 may use a software module for artificial intelligence training stored in the storage 110 or a software module for artificial intelligence training stored in the computer-readable medium.

The training of the artificial intelligence model may not be carried out by the processor 120 of the electronic device 100. For example, an artificial intelligence model trained based on a DNN in an external device (not shown) may be stored in the storage 110 of the electronic device 100, and the processor 120 may use the stored artificial intelligence model.

The electronic device 100 may receive input of data necessary in additionally training the artificial intelligence model from the external device, and update the artificial intelligence model through the method of additionally training the stored artificial intelligence model.

Alternatively, the electronic device 100 may perform an update on the artificial intelligence model through the method of receiving, from an external device, an artificial intelligence model which is more trained compared to the trained artificial intelligence model stored in the storage 110 and storing the received artificial intelligence model in the storage 110. The electronic device 100 may delete some or all of the data on the existing artificial intelligence model.

The processor 120 may, through the trained artificial intelligence model, identify a parameter on each of the plurality of filters used in the image processing of an input image, and perform filtering on the input image through the plurality of filters based on the identified parameter to perform image processing on the input image.

The artificial intelligence model may be trained based on a training image, and a training parameter on each of the plurality of filters required in the filtering for converting the training image to a target image.

FIG. 4 illustrates an example of a training parameter for the artificial intelligence model to convert each of the training images to a high quality target image.

Referring to FIG. 4, image 1 of the training subject images may be an image with relatively much noise, and it may be preferable to raise the parameter (referring to numeral '32' in FIG. 4) on the noise removal filter to convert to a target image without noise.

On the other hand, image 2 may be an image requiring sharpness enhancement clarifying the boundary since the boundary of the object in unclear. Accordingly, with respect to image 2, it may be preferable to raise the parameter (referring to numeral '20' in FIG. 4) on the sharpness enhancement filter.

In addition, image 3 may be an image requiring further brightening of a bright part and further darkening of a dark part since the distinction of the bright part and the dark part is not clear. Accordingly, with respect to image 3, it may be preferable to raise the parameter (referring to reference numeral '25' of FIG. 4) on the contrast correction filter.

As described above, the artificial intelligence may learn the data on the respective training images and a suitable value of a parameter corresponding to the respective training images, and use the training data in identifying a parameter on the plurality of filters used in the processing of the input image.

Specifically, based on image 1 of the training images being an image with much noise, and based on the training result of increasing the parameter on the noise removal filter with respect to image 1 which includes much noise, the artificial intelligence model may identify a relatively high parameter of the noise removal filter for processing the input image if there is much noise on the input image.

The artificial intelligence model may be required to define various features of the input image and correlate the features with the parameter of each of the plurality of filters. The correlation may be learned through a set of correlation for each element of the DNN, which is the training basis of the artificial intelligence model.

The feature of the image may correspond to a content of the image or a feature the image signal obtained by converting the image.

The content of the image may include a category and detailed categories of an image, and a category of an image may include a moving image and a photograph, and a detailed category may include, for example, an advertisement image, a new image, a movie, a sports image and the like if the image is the moving image category. Further, if the detailed category is a movie, the detailed category may be defined as an action movie, an SF movie, a romantic movie, or the like of a lower concept than the detailed category.

In addition, the content of the image may include information on whether a specific target is included on the image.

Specifically, the content of the image may include information on whether a highly inflammatory or provocative subject is included on the image.

In an example of identifying a parameter of a filter based on the image content of the image features, the processor 120 may recognize the category of the image through the artificial intelligence model, and may set an image quality value (i.e., a parameter) according to the recognized category. The parameter setting value according to the recognized category may be a previously trained value.

If the detailed category is a movie, the processor 120 may minimize the parameter value on a color or a contrast ratio to provide an image quality corresponding to a movie mode, while maintaining the parameter value (i.e., fixed parameter) until the end of the movie. Further, the processor 120 may change the parameter value on the noise removal or sharpness enhancement in real-time (i.e., variable parameter) and apply to the image.

If the detailed category is a sports image, and specifically a soccer image, the processor 120 may set a high parameter value on the color or the contrast ratio in order to provide an image quality according to a sharp mode, while maintaining the parameter value (i.e., fixed parameter) until the end of the image. Further, based on whether a texture which requires the processing of grass, spectators, and the like to be visibly sharp being included on the image, the processor 120 may change the parameter value on the sharpness in real-time or for each image area (i.e., variable parameter).

In another example, the processor 120 may, through the artificial intelligence mode, take into consideration the content of the input image which includes provocative content such as violent or inflammatory content and set a relatively high parameter value on a mosaic filtering performed by a mosaic filter.

The feature of the image signal may include a frequency feature, and for example, in terms of a frequency signal, the part with particularly severe changes may be considered as corresponding to a noise feature. However, the embodiment is not limited thereto.

The respective filters may not necessarily have only one parameter. In general, the respective filters may, in many cases, control a variety of elements to perform filtering.

Accordingly, the artificial intelligence model may be trained based on a plurality of parameters rather than one parameter with respect to each of the plurality of the filters required when performing filtering on the training image to convert the training image to a target image.

FIG. 5 illustrates another example of a training parameter for the artificial intelligence model to convert each of the training images to a target image of a higher quality.

Through the training parameter as in FIG. 5, the artificial intelligence model may, in terms of processing each training image, learn an appropriate numerical value (i.e., training parameter) on the plurality of parameters included in each filter.

The training data shown if FIGS. 4 and 5 may be input to the electronic device 100 by the user and used in the training of the artificial intelligence model.

The training data may be based on data on a method of analyzing an image by other external image processing devices (not shown).

The training image shown in FIGS. 4 and 5 may be an image corresponding to a high quality original data. Alternatively, the training image may be, not the original data, but an image corresponding to transformed data provided to the electronic device 100 through broadcasting, streaming service and the like by post-processing the original data.

The processor 120 may, based on a feature of the image signal corresponding to the image input through the artificial intelligence model and the trained correlation, identify a parameter on each of the plurality of filters used in the image processing of the input image.

For example, if an artificial intelligence model is trained to identify a parameter value on filter B as '10' with respect to a training image with a specified feature A, the processor 120 may identify the parameter value of filter B as '10' with respect to processing the input image, if the input image has the same feature A.

The feature of the image which is learned by the artificial intelligence model and the correlation of the parameter may not necessarily be simply defined by only the one feature and the one to one relationship of the parameter. In general, the processor 120 may, based on the countless features of the image defined by the trained artificial intelligence model and the complex correlation between the plurality of parameters, identify a parameter on the plurality of filters for processing the input image.

Figure 6:
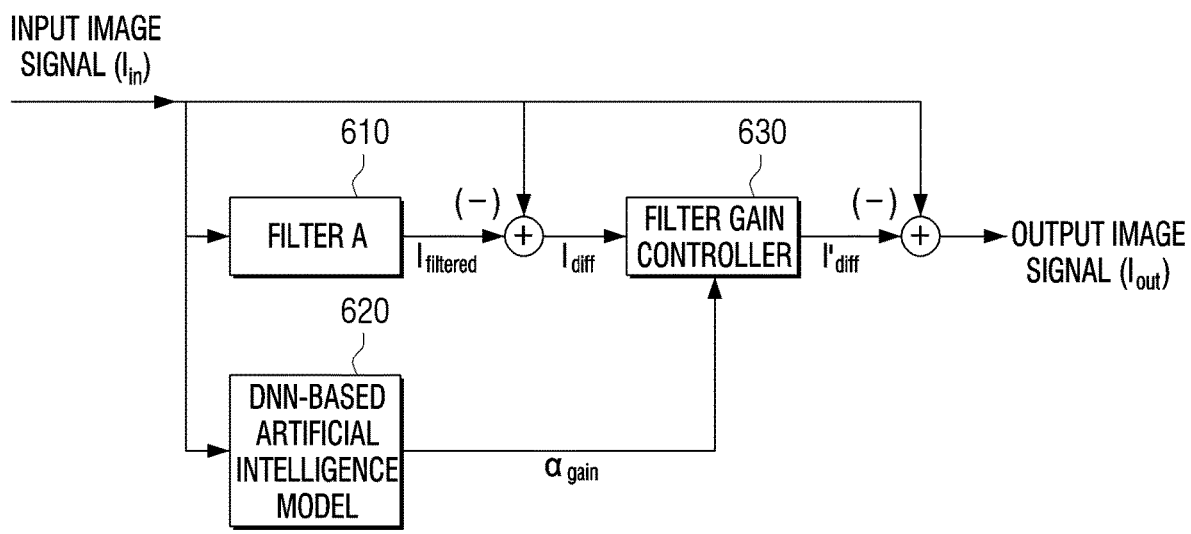
FIG. 6 is a diagram illustrating an example of one filter of a plurality of filters filtering an input image in terms of an electronic device according to an embodiment of the disclosure.

FIG. 6 is a diagram illustrating an example of filter A 610 performing processing of an input image based on an identified parameter based on the processor 120 identifying the parameter of filter A 610 on the input image.

Referring to FIG. 6, when an image signal $I_{in}$ of the input image is input, the image signal $I_{in}$ may be filtered to a maximum value $\alpha_{max}$ performable by filter A 610 and become "$I_{filtered}$."

The processor 120 in FIG. 6 may identify a parameter $\alpha_{gain}$ for filter A 610 on the image input through the trained artificial intelligence model 620.

Based on $I_{in}$ and $I_{diff}(=I_{in}-I_{filtered})$ which is the result of calculating $I_{filtered}$ being input to a filter gain controller 630, $I'_{diff}(=\alpha_{gain}/\alpha_{max}*I_{diff})$ may be gained using $I_{diff}$ and $\alpha_{gain}$.

Based on calculating $I'_{diff}$ and $I_{in}$, the output image signal ($I_{out}=I_{in}-I'_{diff}$) to which filtering of filter A is performed may be obtained based on calculating $I'_{diff}$ and $I_{in}$.

The process of FIG. 6 may be performed on each filter in parallel. However, this is merely one example, and the parameter based filtering control is not necessarily limited thereto.

The processor 120 may be configured to perform filtering on the input image sequentially through the plurality of filters based on the identified parameter.

That is, the processor 120 may control the respective filters based on the identified parameter, while the input image may pass through the respective filters controlled by the processor 120 sequentially, and a sequential image processing on the input image may be performed for each of the respective filters.

The artificial intelligence model may be additionally trained based on the image to be input and the identified parameter. That is, the image to be input and the identified parameter may also be used as a training image and a training parameter, respectively.

In addition, the artificial intelligence model may be additionally trained on a content consumption environment of a user based on the image to be input.

The user content consumption environment may include an average resolution of an image to be input, a network environment to which image is to be input, and the like.

In an example, if the average resolution of the image to be input is quite low, the processor 120 may identify the parameter of the sharpness enhancement filter that processes the image to be input as higher on average, through an artificial intelligence model that learned a low resolution feature of the image to be input.

Figure 7:
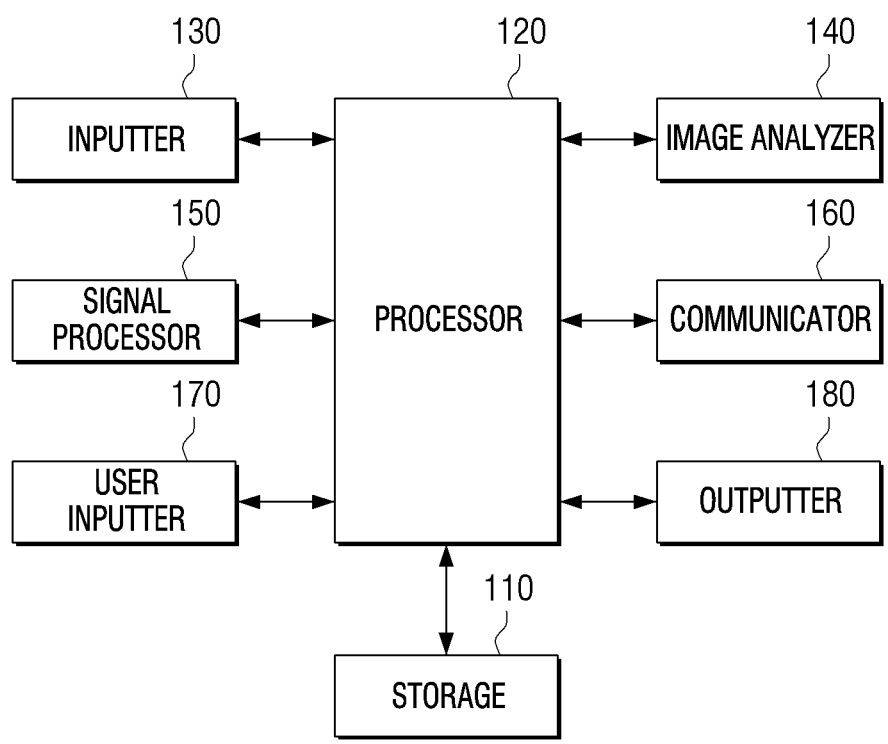
FIG. 7 is a block diagram illustrating a detailed configuration of an electronic device according to various embodiments of the disclosure.

FIG. 7 is a block diagram illustrating a detailed configuration of an electronic device according to the various embodiments of the disclosure.

Referring to FIG. 7, the electronic device 100 may include a storage 110, a processor 120, an inputter 130, an image analyzer 140, a signal processor 150, a communicator 160, a user inputter 170, an outputter 180, and the like.

The inputter 130 may receive input of data and signal through a wired method or a wireless method from an external device (not shown).

The inputter 130 may receive input of an image signal or a sound signal from an external device.

In an example, if the electronic device 100 is a TV and the external device is a set-top box, the inputter 130 may receive a real-time broadcast content that the external device received from a broadcasting station (not shown), or receive content provided through a video on demand (VOD) service.

The inputter 130 may include at least one of a high-definition multimedia interface (HDMI) terminal, a component terminal, or a universal serial bus (USB) terminal to connect with the external device, or a communication module for connecting to a network, such as an internet, to connect with an external device through the network.

The inputter 130 may also receive input of a user voice externally. The inputter 130 may also include a microphone (not shown) to convert sound into a signal form.

The image analyzer 140 may be a configuration for analyzing at least one feature of the input image. The image analyzer 140 may analyze the feature of the input image signal and convert the feature into a numerical value for each element (: quantify each element).

The processor 120 may train the artificial intelligence model based on the feature of the image signal analyzed in the image analyzer 140. In addition, the processor 120 may, based on the feature of the input image signal analyzed in the image analyzer 140 and the artificial intelligence model, identify a parameter on the plurality of filters for processing the input image signal.

The signal processor 150 may perform signal processing on an image on which image processing is performed by an image input through the inputter 130 and a plurality of filters. In addition, the signal processor 150 may also perform signal processing on a sound input through the inputter 130.

Specifically, the signal processor 150 may perform operations such a decoding, scaling and converting framing rate on an image signal or a sound signal.

The communicator 160 may be configured for the electronic device 100 to transmit and receive data with an external device (not shown) through a wired method or a wireless method.

In an example, the communicator 160 may receive data on an image or sound from an external server (not shown) or a broadcasting station (not shown).

In addition, the communicator 160 may also transmit data on an image or sound which has completed processing in the electronic device 100 back to the external server or the broadcasting station.

When training of the artificial intelligence model is carried out in an external device (not shown), the communicator 160 may also receive data on the trained artificial intelligence model from the external device. The processor 120 may store data on the received artificial intelligence model on the storage 110 and use the artificial intelligence model.

The communicator 160 may, in order to update the image enhancement function of the electronic device 100 on the input image, receive technology on image enhancement and data on an algorithm from the external server. The processor 120 may train the artificial intelligence model based on the received technology and the algorithm.

The user inputter 170 may receive input of various user commands on the electronic device 100.

The user inputter 170 may receive various remote control signals. In addition, the user inputter 170 may include a microphone (not shown) for receiving user voice so that the user may control the electronic device 100 in the form of an utterance.

The user inputter 170 may be implemented as an input panel. The input panel may be comprised of a touch pad, a key pad including various function keys, number keys, special keys, character keys, and the like, or in a touch screen method. The input panel may be implemented in an integrated form with a display (not shown) of the outputter 180.

When the user inputter 170 that received a remote control signal or a user command such as a voice or touch transmits the corresponding instruction to the processor 120, the processor 120 may perform a function of the electronic device 100 corresponding to the instruction.

The outputter 180 may include a display (not shown) for displaying an input image or an image in which the input image is filtered through a plurality of filters, and an audio outputter (not shown) for outputting input sound and a sound in which the input sound is filtered through other plurality of filters.

The display (not shown) may be implemented as a liquid crystal display (LCD), an organic light emitting diode (OLED) display, and the like, and the audio outputter (not shown) may be implemented as a speaker (not shown), an external output terminal (not shown), or the like.

According to an embodiment, the storage 110 included in the electronic device 100 may be stored with an artificial intelligence model trained to identify a parameter on a plurality of filters used in sound processing based on a deep neural network (DNN).

The DNN layer structure may include a RNN based layer structure. Through the above, the sound signal being data which changes based on time may be appropriately reflected in the training of the artificial intelligence model.

The processor 120 may, through the artificial intelligence model, identify a parameter on each of the plurality of filters used in the voice processing of the input sound, and perform filtering on a sound input through the plurality of filters based on the identified parameter to perform sound processing on the input sound.

The plurality of filters may be implemented as a noise filter, a low pass filter, a median pass filter, a high pass filter, and the like on the input sound. However, because any filter is possible so long as the filter is for improving the quality of sound, the plurality of filters may not necessarily be limited to the filters described above.

The artificial intelligence model may be trained based on a training subject sound and a parameter on each of the plurality of filters required when performing filtering on a training subject sound to convert the training subject sound into a target quality sound.

Specifically, the artificial intelligence model may be trained on a feature of the sound signal corresponding to the training subject sound and a correlation of the parameter on each of the plurality of filters required when performing filtering on the training subject sound.

FIG. 8 is a diagram illustrating a training subject of an artificial intelligence model in terms of an electronic device 100 processing a sound signal according to an embodiment of the disclosure.

Referring to FIG. 8, a suitable parameter value (i.e., training parameter) for controlling each filter to fit each training sound feature may be verified. Based on a training subject as in FIG. 8, the processor 120 may train the artificial intelligence model.

The processor 120 may identify a parameter on a noise filter, a low pass filter, a median pass filter, a high pass filter, and the like used in the sound processing of the input sound through the artificial intelligence model, and perform filtering on the input sound through the plurality of filters based on the identified parameter to perform sound processing on the input sound.

The pre-set parameter in FIG. 8, may refer to a parameter indicating a mode for comprehensively controlling a parameter on a plurality of filters based on one or more elements of the input sound feature.

For example, if the input sound is a musical piece, each value of the pre-set parameter may be set as 1: classical mode, 2: rock mode, 3: ballad mode, 4: hip hop mode, and the like based on the genre of the musical piece, and the parameter values on a plurality of predetermined filters may be comprehensively learned for each mode to perform a sound processing that is most suitable according to the genre of the input musical piece.

FIG. 9 is a flowchart illustrating an image processing method of an electronic device according to an embodiment of the disclosure.

With respect to the image processing method, based on the DNN, the artificial intelligence model may be trained to identify a parameter on the plurality of filters used in image processing (S910).

The plurality of filters may be a filter for noise reduction, a filter for sharpness enhancement, a filter for contrast correction, a filter for color correction, a filter for brightness adjustment, a filter for performing mosaic processing, and the like on an input image.

The parameter of the plurality of filters may be a variable indicating the degree of filtering an input image by each of the plurality of filters. The depth of an applicable parameter value with respect to each filter may be determined based on the hardware-like performance of each filter.

The artificial intelligence model may be trained, using the DNN accelerator, to identify a parameter on the plurality of filters used in the image processing.

The artificial intelligence model may be trained based on a training image and a parameter on each of the plurality of filters required when performing information on the training image to convert the training image to a target image.

The information on the training image and the parameter used in the processing of the training image may be designated as a set answer to be copied in terms of the artificial intelligence model identifying a parameter on the input image, and the data may be referred to as a ground truth data. By directly using the ground truth data in the training of the artificial intelligence model, there is the advance of time and energy being saved in terms of the artificial intelligence model training.

Specifically, the artificial intelligence model may be trained for the artificial intelligence model to identify the feature of the image signal corresponding to the training image and the correlation of the parameter on each of the plurality of filters required when performing filtering on the training image.

Alternatively, after the artificial intelligence model is trained based on the training image and the parameter on each of the plurality of filters, the corresponding artificial intelligence model may be additionally trained through the user content consumption environment based on an image to be input.

Through the artificial intelligence mode, a parameter on each of the plurality of filters used in the image processing of the input image may be identified (S920).

Based on the feature of the image signal corresponding to the input image and the correlation, a parameter on each of the plurality of filters used in the image processing of the input image may be identified.

Then, after training the artificial intelligence model based on the training image and the parameter on each of the plurality of filters, the corresponding artificial intelligence model may be additionally trained through the image to be input and the identified parameter.

Next, image processing on the input image may be performed by performing filtering on the input image through the plurality of filters based on the identified parameter (S930).

Based on the identified parameter, image processing on the input image may also be performed by performing filtering on the input image sequentially through the plurality of filters.

The image processing method described in FIG. 9 may be performed in the electronic device 100 with the configuration illustrated in described in FIGS. 2 and 7, but the embodiment is not limited thereto.

For example, as described above in the electronic device of various types installed with a program for performing the image processing method described in FIG. 9, a parameter on a plurality of filters may be identified to process the image.

The programs may be distributed in a stored state on the recordable medium. In this case, the image processing method may be implemented by a device connected to or equipped with a recordable medium.

The various embodiments described above may be implemented in a recordable medium which is readable by computer or a device similar to computer using software, hardware, or the combination of software and hardware.

By hardware implementation, the embodiments described in the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for performing other functions, or the like.

In some cases, embodiments described herein may be implemented by the processor 120 itself. According to a software implementation, embodiments such as the procedures and functions described herein may be implemented with separate software modules. The each of the above-described software modules may perform one or more of the functions and operations described in the disclosure.

The computer instructions for performing the processing operations in the electronic device 100 according to the various embodiments described above may be stored in a non-transitory computer-readable medium. The computer instructions stored in this non-transitory computer-readable medium may cause the above-described specific device to perform the processing operations in the electronic device 100 according to the above-described various embodiments when executed by the processor of the specific device.

The non-transitory computer-readable medium may refer to a medium that stores data semi-permanently rather than storing data for a very short time, such as a register, a cache, a memory or the like, and is readable by a device. Specific examples of the non-transitory computer-readable medium include a compact disc (CD), a digital versatile disc (DVD), a hard disc, a Blu-ray disc, a universal serial bus (USB), a memory card, a ROM, and the like.

While the various example embodiments of the disclosure have been illustrated and described above, the disclosure is not limited to the specific embodiments described above, and it will be understood by those skilled in the art that various changes in form and details may be made therein without departing from the true spirit and full scope of the disclosure.

What is claimed is:

1. An electronic device, comprising:
    a storage storing an artificial intelligence model trained to, based on a deep neural network (DNN), identify a parameter on a plurality of filters used in an image processing; and
    a processor configured, through the artificial intelligence model, to:
        identify a category of an input image,
        identify a parameter on each of the plurality of filters used in an image processing of the input image based on the identified category of the input image, the parameter on each of the plurality of filters being a variable indicating a degree of filtering an input image by each of the plurality of filters, and
        perform filtering on the input image through the plurality of filters based on the identified parameter to perform image processing on the input image,
    wherein the identified parameter comprises a fixed parameter which is not changed according to a type of scene and a variable parameter which is changed in real-time correlate with the types of scene, the fixed parameter comprising a parameter on a contrast correction ratio and color correction intensity and the variable parameter comprising a degree of noise removal and a degree of sharpness enhancement,
    wherein the artificial intelligence model is trained based on an image and a parameter on each of the plurality of filters required when performing filtering on the image to convert the image to a target image,
    wherein the artificial intelligence model is trained on a feature of an image signal corresponding to the image and a correlation of a parameter on the required each of the plurality of filters,
    wherein the processor is configured to, based on a feature of an image signal corresponding to the input image and the correlation, identify a parameter on each of the plurality of filters used in the image processing of the input image through the artificial intelligence model, and
    wherein the artificial intelligence model is additionally trained on a content consumption environment of a user based on the image to be input after being trained based the image and the parameter on each of the plurality of filters, the content consumption environment of the user comprising an average resolution of an input image and a network environment to which the input image is to input.

2. The electronic device of claim 1, wherein the plurality of filters include at least two of a filter for noise reduction, a filter for sharpness enhancement, a filter for contrast correction, a filter for color correction, a filter for brightness adjustment, and a filter for performing a mosaic processing on the input image.

3. The electronic device of claim 1, wherein the artificial intelligence model is additionally trained through the input image and the identified parameter after being trained based on the image and a parameter on each of the plurality of filters.

4. The electronic device of claim 1, wherein the processor is configured to perform filtering on the input image sequentially through the plurality of filters based on the identified parameter.

5. The electronic device of claim 1, further comprising:
    a DNN accelerator,
    wherein the artificial intelligence model, using the DNN accelerator, is trained to identify a parameter on a plurality of filters used in image processing.

6. The electronic device of claim 1, wherein the each of the plurality of filters filtering the input image identifies the parameter.

7. An image processing method of an electronic device, the method comprising:
    based on a deep neural network (DNN), training an artificial intelligence model to identify a parameter on a plurality of filters used in image processing, the parameter on each of the plurality of filters being a variable indicating a degree of filtering an input image by each of the plurality of filters;
    identifying a category of an input image through the artificial intelligence model,
    identifying a parameter on each of the plurality of filters used in an image processing of the input image based on the identified category of the input image; and
    performing filtering on the input image through the plurality of filters based on the identified parameter to perform image processing on the input image,
    wherein the identified parameter comprises a fixed parameter which is not changed according to a type of scene and a variable parameter which is changed in real-time correlate with the types of scene, the fixed parameter comprising a parameter on a contrast correction ratio and color correction intensity and the variable parameter comprising a degree of noise removal and a degree of sharpness enhancement,
    wherein the training the artificial intelligence model comprises training the artificial intelligence model based on an image and a parameter on each of the plurality of filters required when performing filtering on the image to convert the image into a target image,
    wherein the training the artificial intelligence model comprises training the artificial intelligence model to identify a feature of an image signal corresponding to the image and a correlation of a parameter on the each of the plurality of required filters,
    wherein the identifying the parameter comprises, through the artificial intelligence model, identifying a parameter on each of the plurality of filters used in the image processing of the input image based on a feature of an image signal corresponding to the input image and the correlation, and
    wherein the artificial intelligence model is additionally trained on a content consumption environment of a user based on the image to be input after being trained based the image and the parameter on each of the plurality of filters, the content consumption environment of the user comprising an average resolution of an input image and a network environment to which the input image is to input.

8. The image processing method of claim 7, wherein the plurality of filters include at least two of a filter for noise reduction, a filter for sharpness enhancement, a filter for contrast correction, a filter for color correction, a filter for brightness adjustment, and a filter for performing a mosaic processing on the input image.

* * * * *